United States Patent [19]
Perucca

[11] 3,795,788
[45] Mar. 5, 1974

[54] MACHINE FOR BREWING HOT BEVERAGES, ADAPTED TO PRODUCE STEAM

[75] Inventor: Pietro Perucca, Milan, Italy

[73] Assignee: Omre Costruzioni Elettromeccaniche S.a.S., Milan, Italy

[22] Filed: Mar. 20, 1972

[21] Appl. No.: 236,246

[30] Foreign Application Priority Data
Mar. 24, 1971 Italy................................. 22190/71

[52] U.S. Cl.................... 219/272, 99/281, 219/297, 219/299, 219/325, 219/328
[51] Int. Cl............................ F22b 1/28, F24h 1/00
[58] Field of Search...219/271, 272, 296, 297, 299, 219/301, 303, 323, 325, 327, 328; 99/279–281, 302

[56] References Cited
UNITED STATES PATENTS
2,626,558   1/1953   Stein .............................. 99/302 R X
2,969,451   1/1961   Logan............................. 219/331 X
3,522,909   8/1970   Arant.............................. 126/362 X

*Primary Examiner*—C. L. Albritton
*Attorney, Agent, or Firm*—Holman & Stern

[57] ABSTRACT

In a coffee machine of the kind having a heat exchanger for producing steam intended to heat beverages not brewed directly by the machine, in which a calibrated passageway allows the flow of a portion of the total rate of flow of water towards the exchanger, so as to produce steam when the rate of flow through the exchanger is reduced, whereas hot water is produced when said rate of flow is allowed to remain at the normal value. Thermostatic means are provided to govern the temperature in the heat exchanger.

6 Claims, 2 Drawing Figures

3,795,788

MACHINE FOR BREWING HOT BEVERAGES, ADAPTED TO PRODUCE STEAM

BACKGROUND OF THE INVENTION

This invention relates to a machine for brewing hot beverages, in which a heat exchanger fed with cold water is adapted alternatingly to dispense either hot water or steam. More particularly, the invention relates to a machine in which a source of pressurized water sends the feed water to a heat exchanger, to bring said water to an appropriate temperature.

PRIOR ART

It is known, in such a kind of machine for brewing hot beverages, to provide a heat exchanger which is maintained at a constant temperature by thermostatic means; cold water is caused to flow through the machine and attains a temperature which is more or less close to that of the exchanger, according to the longer or shorter stay of the water in the heat exchanger. If the exchanger is maintained at a temperature over 100° C, the water is obviously converted into steam if it stays in the exchanger for a sufficiently long time; if, conversely, water flows through the exchanger at an appropriate speed, it is heated to a temperature which is appropriate for the brewing of a hot beverage, for example after having been caused to flow through powdered coffee, from which the relevant infusion is drawn.

It is also possible, if so required that the heat exchanger is equipped with two thermostats, either of which, having an upper temperature actuation limit, controls heating whenever the production of steam is required.

The source of pressurized water can either be a pump or the conventional water main on which a pressure regulator is installed so as to provide the machine with a feed which is, as far as this is practicable, constant and independent of the pressure variations in the main.

A special problem is posed, by the variation of the rate of flow of the feeding water to the heat exchanger; more particularly, it is required that the rate of flow might be adjusted to a first value at which the water flows through the heat exchanger at a speed which is appropriately reduced so as to allow the production of steam, or, as an alternative, to a second value at which the water is caused to flow through the exchanger at such high speed as to be merely heated to the required temperature.

It has been suggested that such a variation of the rate of flow be obtained by varying the hydraulic resistance of the circuit, but such an approach is inefficient when the source of pressurized water, for example, a pump, is of the volumetric type. On the other hand, an adjustment on the pump itself, or on the pressure regulator when the source is the water main as such, is technically impractical and comparatively unstable.

SUMMARY OF THE INVENTION

In the machine for brewing hot beverages or for producing steam according to the invention, a source of pressurized water feeds a duct consisting, in a portion, of a heat exchanger, from which either hot water or steam are alternatively dispensed, and a calibrated passageway which can be closed connects said duct upstream of the exchanger with a sink, so that, when said passageway is open, a portion of the water fed by said source to said duct is discharged through the passageway and the other fraction flows through the exchanger at a speed which is low enough to allow the production of steam, and when said passageway is closed, the entire amount of water fed by said source to said duct flows through the exchanger at such high speed that the vaporization temperature cannot be attained.

BRIEF DESCRIPTION OF THE DRAWINGS

In order that the features and the advantages of the machine for brewing hot beverages and for producing steam according to the present invention may be better understood, two exemplary embodiments of the machine will now be described as illustrated in the accompanying drawings, in which FIGS. 1 and 2 respectively show diagrammatical overall views of two machines according to the invention.

DETAILED DESCRIPTION OF THE INVENTION

Figure 1:
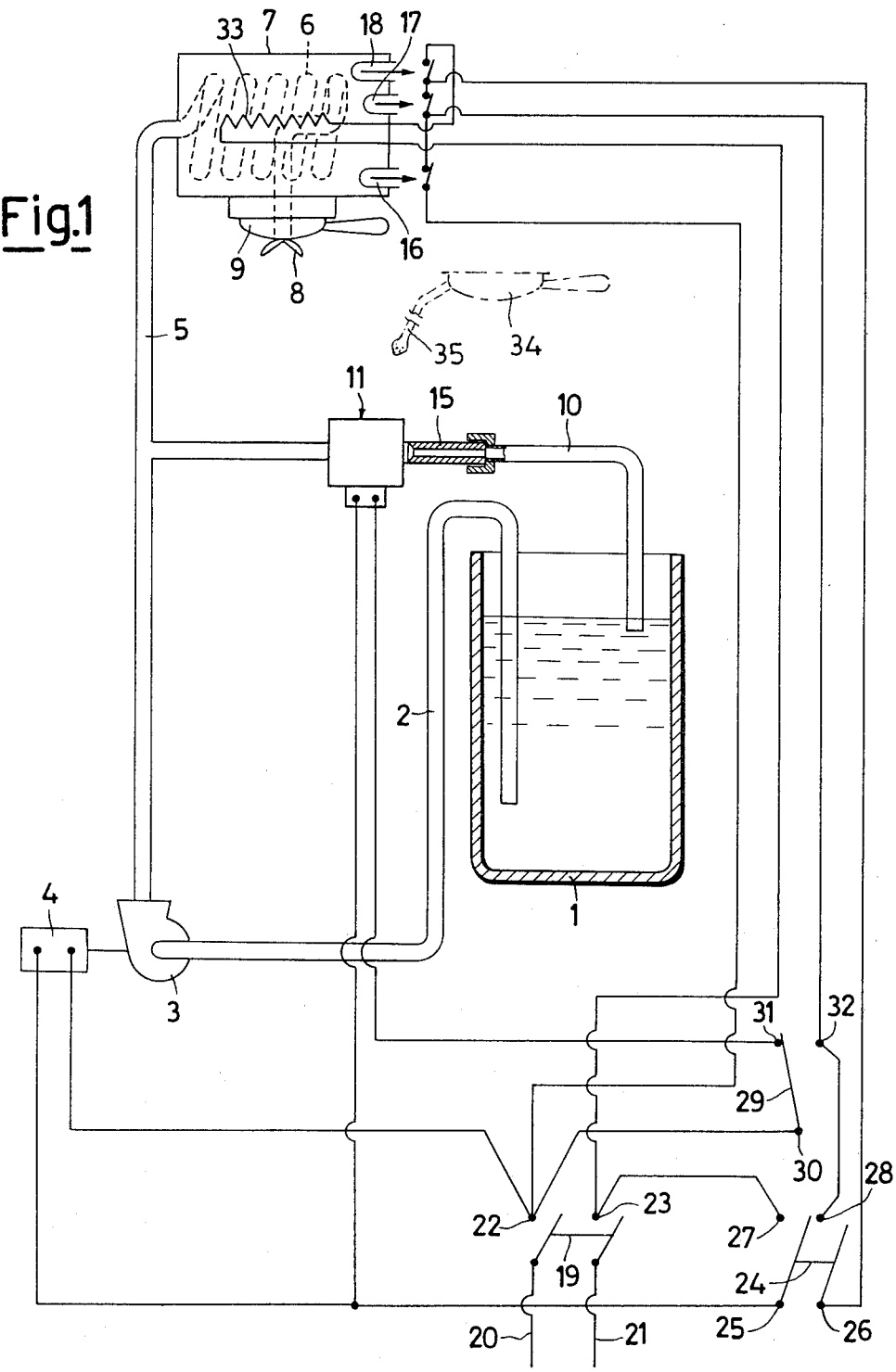

As illustrated in FIG. 1, an open tank 1 has a suction tube 2 dipping therein, with the tube communicating with a pump 3 driven by an electric motor 4 and feeding, through a delivery duct 5, coil 6 of a heat exchanger 7. The water as heated emerges through nozzles 8 of a removable portion 9. According to a conventional arrangement in the machine for brewing infusions, more particularly espresso coffee, a filter is contained within the portion 9, the filter being not shown, for receiving the coffee powder, and the nozzles discharge into a coffee cup or the like, which is positioned underneath. From the duct 5, a discharge duct 10 branches off which dips in the tank 1 and on the duct 10, an electromagnetic valve 11 is mounted. The valve is of a wholly conventional make and is open in the inoperative position and is capable of cutting off the duct 10 whenever the valve is energized. In addition, a calibrated passageway 15 is mounted on the duct 10, with the calibration being possibly variable, in order to achieve the objectives which will be specified hereinafter.

The heating element of the heat exchanger 7 is an electric resistor 33 embedded in the exchanger body, with thermostatic switches 16, 17 and 18. The electric circuitry of the coffee machine as shown herein comprises a main switch 19 which connects the electricity main wih its leads 20 and 21, to poles 22 and 23, respectively.

A second switch 24 is provided, which is enabled to connect poles 25 and 26 to poles 27 and 28, respectively, and a changeover switch 29 which connects a pole 30 alternatively to either 31 or 32.

The thermostatic switches 16, 17 and 18 are calibrated at increasing actuation temperatures, that is, they are open at 95°C, 140°C and 160°C, for example. Of course, other values in the neighborhood of those indicated above can also be selected.

The operation of the machine shown in FIG. 1 will now be described.

As the switch 19 is closed and the changeover switch 29 connects 30 to 31, the wiring diagram shows that the resistor 33 is connected at one end to the line 20 and at the other end to the line 21, through the thermostatic switches 16, 17 and 18. Since these thermostatic switches are serially arranged, it is sufficient that the one thereof which has the lowest actuation limit is open, that is the switch 16, to cut off the electricity feed to the resistor.

As the switch 24 is closed, the pump is actuated and as the changeover switch 29 connects 30 with 31, it feeds also the electromagnetic valve 11. Under these conditions, all the water sent by the pump goes through the exchanger 7, in which it is heated and produces the infusion at 9, and from which it is discharged through the nozzles 8.

Whenever the production of steam is required, the changeover switch 29 is positioned so as to connect 30 with 32; this causes the cutoff of the feed to the electromagnetic valve 11 which opens In addition, the thermostatic switch 16 is short-circuited so that the exchanger attains the temperature at which the switch 17 enters action when the switch 19 is closed. By closing the switch 24, the electric pump 3–4 is actuated and the resistor 33 is fed, with only the thermostatic switch 18 being inserted. Under these conditions, the delivery of the pump is partly discharged by the duct 10 and partly sent to the exchanger 7. By properly sizing the passageway 15, the rate of flow which is passed through the exchanger is so metered with respect to the thermal power of the exchanger that the water is completely converted into steam. It is advisable, as conventionally known, that whenever steam is produced, the portion 9 which carries the filter and has the dispensing nozzles, be replaced by a similar component part 34 carrying an end tube 35 for discharging the steam into a liquid to be heated.

It is apparent that the presence of the thermostat 18 is an addition having the only purpose of preventing accidental overheating and can even be eliminated. A single thermostat can be provided for maintaining the temperature of the exchanger above 100°C when the rate of flow of the pump is so metered with respect to the thermal power thereof that, when the passageway 10 is closed, the water passes through the exchanger at a speed which is sufficient to remain below the vaporization temperature. The duct 10 as cut off by the valve 11 is thus a rate of flow regulating member for the water sent to the exchanger. However, it fulfills also other functions which are extremely important for the coffee machine according to the present invention.

In point of fact, as the pump 3 is stopped, the water is allowed freely to flow out through the duct 10 and the exchanger is emptied, so as to prevent the formation of scale in the interior of the coil 6. In addition, when steam is produced, as the pump is stopped, the presence of the duct 10, causes an increase of the rapidity with which the dispensing of steam towards the outside is discontinued, with the pressure drop in the exchanger being thus encouraged and preventing, in any event that the exchanger may accidentally remain under pressure or, at any rate, that it continues to dispense steam, a fact which makes it difficult to withdraw the liquid into which steam is discharged.

Lastly, the self-adjustment of the rate of flow is not less important, as obtained through the passageway 15, which can obviously be incorporated as an integral part of the valve 11.

As a matter of fact, when it is desired to produce steam, the pump has a rate of delivery which is split between the exchanger and the duct 10. When, at the beginning of the operation, the water reaches the exchanger and is converted into steam, a back pressure is originated within the exchanger, with said back pressure being transferred to the duct 5, and the rate of flow to be discharged through 10 is increased of necessity, while the rate of flow directed to the exchanger is simultaneously decreased.

Conversely, when the steam pressure in the exchanger is decreased, the rate of flow of the water sent by the pump to the exchanger is increased. By so doing, the hydraulic loop has a certain possibility of balancing pressure and rate of flow differentials of the steam, which thus is generated in a quite regular way.

It is important to notice that the valve 11 is never prone to scale and more particularly that caused by the back flow of water from the infusion chamber 9 when the pump is stopped. As a matter of fact, when the machine produces steam, the valve 11 has an energetic water stream flowing therethrough, which carries away possible deposits.

The above indicated functions of the discharge duct 10 of the machine, which can be closed, have thus permitted the solving of a number of problems as posed in this kind of coffee machine for the alternative production of steam.

Figure 2:
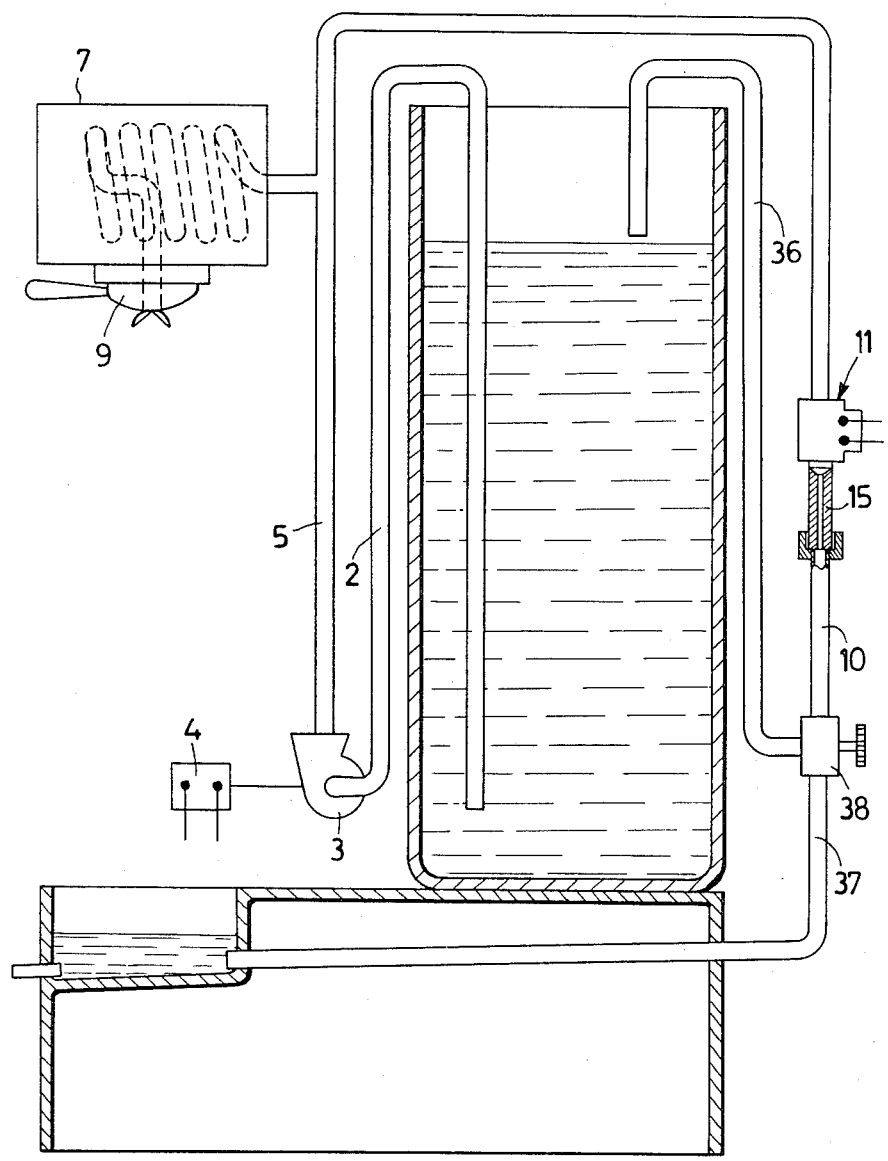

FIG. 2 shows an alternative embodiment of the machine shown in FIG. 1 and in which the component parts similar to those of FIG. 1 have been indicated by the same reference numerals.

In this embodiment, the configuration of the machine has been shown when the exchanger 7 is placed at a level which is not sufficiently high as to permit the discharge by gravity as above described.

In this, the discharge duct 10 is connected, through a two-way valve 38, alternatively with a duct 36 which opens into the tank, or with a duct 37 which freely discharges at a lower level.

The valve 38 is switched to connect the ducts 10 and 36 when steam is produced, and is switched to connect the ducts 10 and 37 when a hot beverage is brewed. In any case, the heating of the unit 7, the control of the pump and the electromagnetic valve 11 take place in the same manner as described with reference to the embodiment shown in FIG. 1.

With the machine shown in FIG. 2, the advantage is afforded of sending the water in excess during the generation of steam, back to the tank when the heater 7 is emptied at the termination of the delivery for vaporizing the liquid left therein. When, conversely, the valve 11 opens at the end of the dispensing of the beverage, the heater is emptied by a siphoning effect through the ducts 10 and 37 and its contents is discharged to the exterior without contaminating the water in the tank.

As outlined, above, the machine as described herein is a mere example and the cutoff valve 11, the exchanger, the pump (this may be either volumetric or not) and any other component parts can be of many different shapes, the same being true of the arrangement of the component parts of the machine which can be variously modified.

What is claimed is:

1. A machine for brewing hot beverages of the infusion type and for producing and dispensing steam into a liquid to be heated, comprising a source of water under pressure, a first duct having a portion thereof constituting a heat exchanger from which hot water or steam are alternatively dispensed, said first duct being in communication with the source of water, a sink, a second duct in communication with the sink and the first duct between the source of water and the portion of the first duct constituting the heat exchanger, said second duct being provided with a calibrated passageway capable of being closed, the arrangement being such that when the passageway is open, a portion of the water fed by the source to the first duct is discharged through the calibrated passageway and the other portion flows through the heat exchanger with a rate of flow sufficiently low to permit the production of steam and when the calibrated passageway is closed, the whole rate of flow of water from the source through the first duct flows through the heat exchanger at a flow rate sufficiently high to prevent attainment of the vaporization temperature, means for varying the temperature in the heat exchanger, and cutoff means for closing the calibrated passageway, said cutoff means being operably related to the temperature varying means so as to raise the temperature when the passageway is open.

2. The machine as claimed in claim 1, in which the source of water under pressure is a pump.

3. The machine as claimed in claim 2, including a tank, and said pump drawing water from said tank.

4. The machine as claimed in claim 3, in which said sink is a duct which alternatively discharges water through a two-way valve either into the tank or to the exterior.

5. A machine as claimed in claim 2, including pump-actuating means in which the calibrated passageway can be closed by the cutoff means being combined with the pump-actuating means, in the sense of opening said passageway when the pump is stationary.

6. The machine as claimed in claim 5, in which said cutoff means is an electromagnetic valve, and said pump-actuating means is defined by an electric motor fed by an electric line, and switching means connecting the electric line with the electromagnetic valve so that the electromagnetic valve is energized to be closed against the bias of a resilient means when the switching means are closed and the electric motor energized.

* * * * *